(12) United States Patent
Wilson

(10) Patent No.: US 8,360,122 B2
(45) Date of Patent: Jan. 29, 2013

(54) SEALANT MATERIAL COMPOSITION, SELF-SEALING PNEUMATIC TIRE, AND PREPARATION THEREOF

(75) Inventor: Joshua L. Wilson, Benton, IL (US)

(73) Assignee: Continental Tire The Americas, LLC, Fort Mill, SC (US)

( * ) Notice: Subject to any disclaimer, the term of this patent is extended or adjusted under 35 U.S.C. 154(b) by 1280 days.

(21) Appl. No.: 12/114,369

(22) Filed: May 2, 2008

(65) Prior Publication Data

US 2009/0272476 A1    Nov. 5, 2009

(51) Int. Cl.
*B29C 73/16* (2006.01)

(52) U.S. Cl. .......................... 152/503; 523/166

(58) Field of Classification Search .................. 152/503; 523/166
See application file for complete search history.

(56) References Cited

U.S. PATENT DOCUMENTS

| | | | |
|---|---|---|---|
| 2,756,801 A * | 7/1956 | Iknayan et al. | 152/504 |
| 3,048,509 A | 8/1962 | Sweet et al. | |
| 3,772,410 A | 11/1973 | Lal et al. | |
| 4,140,167 A | 2/1979 | Böhm et al. | |
| 4,171,237 A | 10/1979 | Böhm et al. | |
| 4,228,839 A | 10/1980 | Böhm et al. | |
| 4,426,468 A * | 1/1984 | Ornum et al. | 523/166 |
| 4,895,610 A | 1/1990 | Egan | |
| 6,207,723 B1 * | 3/2001 | Matsushita et al. | 521/41 |
| 6,255,389 B1 | 7/2001 | Ouhadi et al. | |
| 6,465,578 B1 | 10/2002 | Bissonnette et al. | |
| 6,818,693 B2 * | 11/2004 | Heinrich et al. | 524/445 |
| 6,837,287 B2 * | 1/2005 | Smith et al. | 152/503 |
| 7,073,550 B2 | 7/2006 | Reiter et al. | |
| 2005/0084640 A1 | 4/2005 | Bilodeau et al. | |
| 2006/0169393 A1 | 8/2006 | Botts et al. | |

OTHER PUBLICATIONS

The Goodyear Tire & Rubber Company, Announces an Air-tight New Idea in Commercial Tire Sealant Technology, 2005, 2 pages.

* cited by examiner

*Primary Examiner* — Joseph Del Sole
*Assistant Examiner* — David N Brown, II
(74) *Attorney, Agent, or Firm* — Greenblum & Bernstein, P.L.C.

(57) ABSTRACT

Pneumatic tire including a sealant material composition providing puncture sealing property within the sealant material composition includes a compound containing a diphenyldisulfide structure therein.

27 Claims, 2 Drawing Sheets

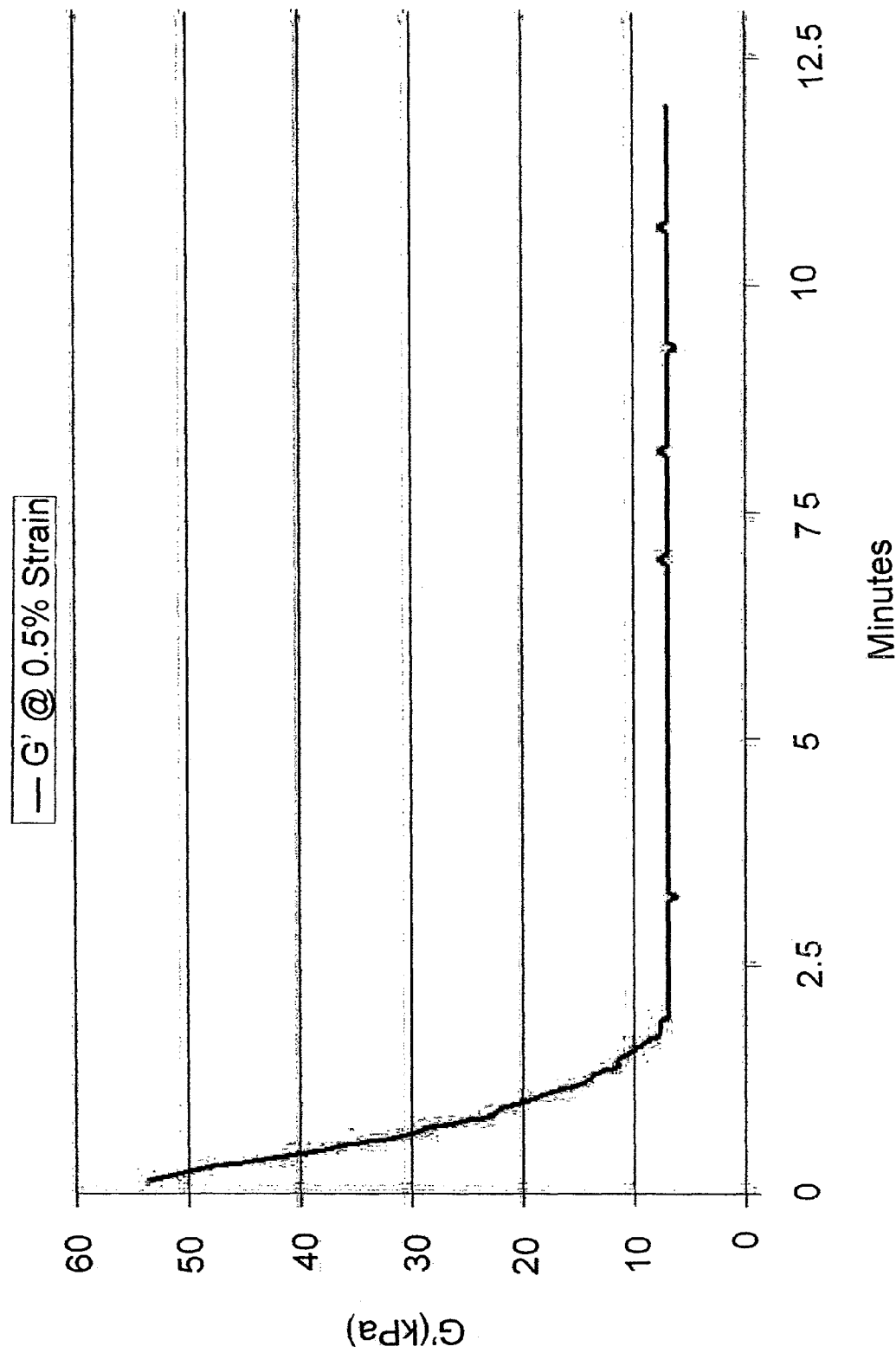

SEALANT MATERIAL COMPOSITION, SELF-SEALING PNEUMATIC TIRE, AND PREPARATION THEREOF

FIELD OF THE INVENTION

This invention relates to sealant material compositions for use in pneumatic tires, such as tires with or without inner tubes, such as automobile and truck tires, capable of providing pneumatic sealing properties to the tires. The present invention also relates to tires containing the sealant material compositions, to methods of manufacturing the tires and methods of using the tires. The present invention relates to the protection against carcass punctures in originals tires as well as in retreaded tires.

BACKGROUND OF THE INVENTION

U.S. Pat. No. 4,895,610 to Egan relates to a pneumatic tire which contains a built-in sealant layer prepared by building a layer of butyl rubber-based composition, which contains a polyisobutylene polymer, following which under the conditions of elevated temperature and pressure used to cure the tire, a major portion of the butyl rubber is presented as being both crosslinked and depolymerized to form a tacky material which has puncture sealant properties.

U.S. Pat. Nos. 4,228,839, 4,171,237 and 4,140,167 also relate to a sealant layer in a tire formed by depolymerizing and crosslinking a butyl rubber based rubber composition, particularly by irradiation treatment Patents relating to tire constructions, sealant compositions and methods wherein a sealant material is encased or encapsulated in between calendered layers, included, for example, U.S. Pat. No. 3,048,509 and U.S. Pat. No. 4,228,839.

Additionally, other documents include U.S. Pat. No. 7,073,550 B2 to Reiter et al. and U.S. Published Patent Application No. US 2006/0169393 A1 to Botts et al.

U.S. Pat. No. 6,837,287 to Smith Sr. et al. is directed to a method for manufacturing self-sealing pneumatic rubber tires with puncture sealant properties. In the tire building method of Smith, a layer of butyl rubber-based robber composition is assembled into an unvulcanized tire, wherein the butyl rubber composition contains a dispersion therein of precured rubber particles as resin-cured butyl rubber and/or sulfur-cured diene-based rubber, and also containing at least one peroxide that will depolymerize the butyl rubber at the temperatures used to cure the tire. Smith discloses that, in effect, the butyl rubber in the rubber composition is degraded (depolymerized) to a low viscosity to form a tacky material which has puncture staling properties. In the method of this invention, the butyl rubber based rubber composition is assembled into the unvulcanzed rubber tire and the tire is vulcanized using standard known methods which depolymerize and convert the butyl rubber based rubber composition into a sealant layer. In effect it is considered that the peroxide depolymerizes the saturated backbone of the butyl rubber.

Despite the method of Smith it would be useful to have a process for manufacturing self-sealing pneumatic rubber tires, preferably for truck tires, that does not require the use of peroxide.

SUMMARY OF THE INVENTION

The present invention provides an uncured sealant material composition comprising at least one non-halogenated butyl rubber, and at least one compound containing a diphenyldisulfide structure, the sealant material composition having a viscosity, when uncured, that permits uncured sealant material composition to be incorporated into a tire during a tire building process and a viscosity, when cured, that permits cured sealant material composition to flow into and seal a puncture in a tire.

The present invention is also directed to a method of forming an uncured sealant composition comprising combining at least one non-halogenated butyl rubber and at least one compound containing a diphenyldisulfide structure so that the sealant material composition has a viscosity, when uncured, that permits the sealant material composition to be incorporated into a tire during a tire building process and a viscosity, when cured, that permits the material to flow into and seal a puncture in a tire.

The uncured sealant material composition can have an elastic storage modulus of 75 to 250 pka at 10% strain.

The cured sealant material composition can have an elastic storage modulus of 1 to 25 pka at 10% strain.

The at least one compound containing a diphenyldisulfide structure can be present in an amount of 2 to 20 phr.

The at least one compound containing a diphenyldisulfide structure can be present in an amount of 5 to 15 phr.

The sealant material composition can further include at least one modulus agent.

The at least one modulus agent can comprise at least one silica containing material.

The at least one modulus agent can be present in an amount of 5 to 50 phr.

The sealant material composition can further comprise at least one process oil.

The at least one process oil can be present in an amount of 10 to 40 phr.

The sealant material composition can further comprise at least one non-reinforcing filler.

The at least one non-reinforcing filler can comprise at least one clay.

The at least one non-reinforcing filler can be present in an amount of up to 15 phr.

The sealant material composition can further comprise at least one tackifying agent.

The at least one tackifying agent can comprise at least one phenolic resin.

The at least one tackifying agent can be present in an amount of up to 5 phr.

The sealant material composition can further comprise a whiting agent.

The sealant material composition can further comprise at least one plasticizer.

The present invention is also directed to a sealant material composition formed by method according to the present invention.

The present invention is also directed to unvulcanized tires comprising an innerlayer a carcass layer, and a sealant material composition material containing the sealant material composition according to the present invention as a layer between the innerlayer and the carcass layer.

The layer of sealant material composition can have a thickness of 0.1 inch to 0.5 inch, or 0.2 to 0.5 inch.

The present invention is also directed to vulcanized tires comprising the sealant material composition according to the present invention.

BRIEF DESCRIPTION OF THE DRAWINGS

The present invention is further described in the detailed description that follows by way of non-limiting examples of exemplary embodiments of the present invention, wherein:

FIG. 2 illustrates a diagram of RPA test output during curing phase at 170° C. for 12 minutes

DETAILED DESCRIPTION OF THE INVENTION

Figure 1:
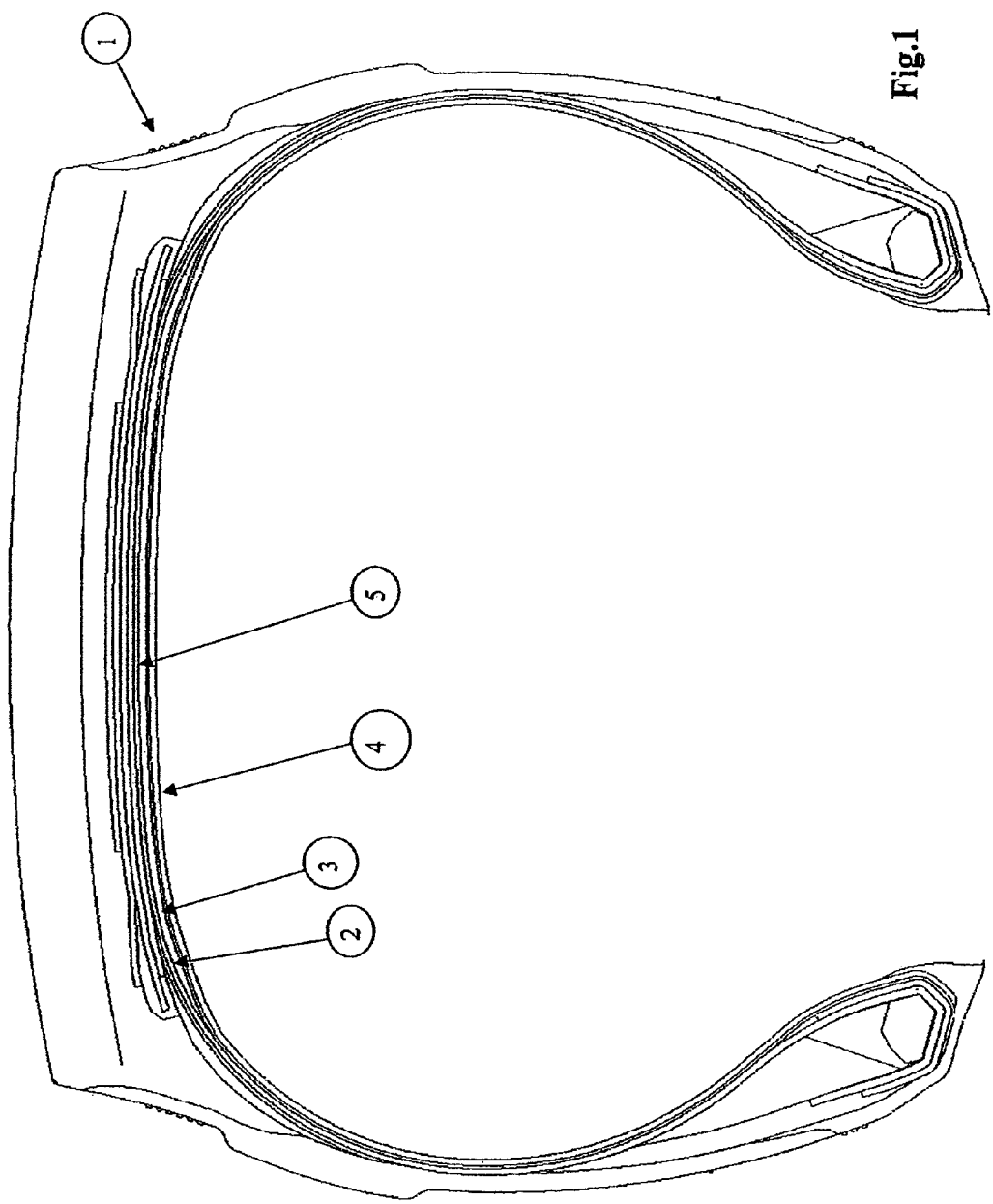
FIG. 1 shows a tire including the sealant material composition layer according to the present invention, with the exemplary embodiment showing sealant layer 2 between Ply 3 (Steel/Rubber composite with steel cords running in the radial direction from bead to bead) and innerliner 4 of a rubber layer with a low air permeability as well as a thin protective layer between innerliner and the ply called a squeegee.

Unless otherwise stated, a reference to a compound or component includes the compound or component by itself, as well as in combination with other compounds or components, such as mixtures of compounds.

As used herein, the singular forms "a" "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

In the description of this invention, the term "phr" is used to designate parts by weight of an ingredient per 100 parts of rubber and/or elastomer unless otherwise indicated. The terms "cure" and "vulcanize" are used interchangeably unless otherwise indicated.

Each and every document cited in this application is incorporated by reference herein in its entirety.

The present invention provides sealant material compositions capable of being used in pneumatic rubber tires to provide self-sealing properties to the tires, especially to reduce or stop air leakage from the tire after punting. The present invention also relates to pneumatic rubber tires having self-sealing properties so as to especially provide puncture sealing properties to the tires as well as to methods of producing and/or using the tires.

The present invention can provide protection against carcass punctures that follows the casing through its retreaded carcass lives. Thus, the present invention is directed to originally manufactured tires as well as tires that have been retreaded.

The present invention thus provides a sealant material composition that can be included in a tire, preferably in layer form. The sealant material composition includes a number of functional properties permitting its incorporation into tires as well as to provide sealing ability in the tire. In particular, the sealant material composition has sufficient stiffness to be incorporated into a tire during production of the tire. Moreover, the sealant material composition has sufficient softness following production of the tire, and during use of the tire, to achieve sealing of the tire, such as upon puncturing, including but not limited to puncturing of the tire with an elongated object, such as a nail or a screw.

The sealant material composition preferably comprises a combination of ingredients that provide sufficient stiffness so that the sealant material in an uncured state can be included in a tire during manufactures of the tire. The sealant material composition is thereafter converted, such as by heat present during tire production, to depolymerize or degrade at least one component of the sealant material composition to become soft and flowable to seal an opening in the tire. For example, at temperatures usually present during tire curing, the sealant material composition can cure to have sufficient sealing properties in as little as two minutes or less. Accordingly, the sealant material is able to handled from mixing through tire building in a manner similar to that for components usually incorporated into tires during tire production. Thus, the sealing material composition has characteristics that permit its use in tire manufacture, such as being placed in the unvulcanized tire for curing, including be placed as a layer in the uncured tire. The sealing functionality of the sealant material composition only achieves its softer state for sealing an air leak in a tire after curing of the tire begins, and is present when the tire is in its cured state.

The sealant material composition prior to curing, which is also referred to as the green sealant material composition, as a strength that permits the sealant material composition to be directly handled and built into a tire. Preferably, the green sealant material composition has a G' value within the range of 75 to 250 pka, such as 85 to 225 pka, 100 to 150 pka at 10% strain.

Following curing, the cured material has a viscosity that permits the cured sealant material composition to flow into and seal carcass punctures with a low resistance to filling the puncture. Preferably, the cured sealant material composition has a G' of about 1 to 25 pka, and is preferably less than 10 pka, such as 2 to 8 pka, or 3 to 7 pka at 10% strain.

G' is determined using a Monsanto RPA, or its equivalent, and the following procedure, using a sample mass of 5 g, using a model such as an RPA2000, Software Version 8.50, using a same rotor geometry as for MDR.

In the RPA test procedure the following steps are performed;

Step 1: (Uncured Sample)
Strain Sweep (1-50% strain, measurements at 1% intervals)
Temperature=80° C.
Frequency=1 Hz
Step 2. Heat sample for 12 minutes at 170° C.
Step 3: (Cured Sample)
Strain Sweep (1-50% strain, measurements at 1% intervals)
Temperature=80° C.
Frequency=1 Hz The sealant material is positioned in the tire at any location between the innerliner and the carcass ply, and is preferably between a squeegee above the innerlayer and the carcass layer. For example, and without limitation, as illustrated in FIG. 1, it can be seen that a squeegee layer 3 is positioned above the innerliner 4, and the sealant material composition 2 can be located between the squeegee layer 3 and the carcass ply 5 of the tire 1.

As noted above, in the cured tire, the material is sufficiently soft to flow with respect to an opening in the tire, such as to flow around a penetrating object and stop any air loss or further air loss through the opening. The opening can be of any size that can be sealed by the sealant material, such as but not limited to an opening as large as 0.25 inch in diameter. Furthermore, if a penetrating object is thrown from the casing during use of the tire, the cured sealant material composition can flow to fill the void left with the force of the tire's own internal pressure.

The sealant material composition according to the present invention can comprise a composition including at least one non-halogenated butyl rubber-based rubber and at least one substance capable of depolymerizing the butyl rubber at temperatures used to cure the tire. In effect, the non-halogenated butyl rubber in the rubber composition is degraded or depolymerized to a low viscosity to form a tack material which has puncture sealing properties.

In the method of this invention, the sealant material is assembled into the unvulcanized rubber tire and the tire is vulcanized using any technique, such as any standard method, capable of depolymerizing the non-halogenated butyl rubber in the sealant composition into a layer including the sealant material.

The thickness of the sealant composition layer can vary greatly in an unvulcanized puncture sealant containing tire. Preferably, the sealant material composition can be incorporated into the tire as a layer, which layer can have a tapered cross-section. The green layer preferably has a thickness within a range of 0.1 inch to 0.5 inch, or 0.2 inch to 0.4 inch, such as 0.3 inch. The strip of sealant material composition employed as the sealant material composition layer preferably extends from one shoulder of the tire to the other, in other words, it preferably covers the crown area or region of the tire. In passenger tires, it is normally desired for the sealant composition layer to have a thickness of about 0.32 cm (0.125 inches) whereas for truck tires, a thickness of about 0.76 cm (0.3 inches) or greater might be desired. The shape of the profiled layer may be created by either a cold feed extrusion process or via a profiled calendar roll. The shape of the profile should be made in such a way as to fit the contour of the ply so that the possibility of trapping air at the edge of the sealant is reduced as much as possible.

The sealant layer can be introduced into the tire at the green component assembly station which is commonly referred to as a tire building machine. The sealant layer can be inserted with an extra step between the application of the innerliner and the ply (see FIG. 1). The material is preferably centered appropriately in order to have an uniform distribution across both sides (shoulder to shoulder) of the tire. The remaining sets of the tire assembly process can remain the same as a tire without a built in sealant layer.

The tire can then be cured in a standard curing press with no additional precautions made for the shaping and depolymerization of the sealant layer. The depolymerization time of the sealant layer is sufficiently short as to not require any time to be added to a standard tire cure (150° C. for 45 minutes or 145° C. for 50 minutes). The force of the internal curing bladder is sufficient to displace the sealant layer and hold the sealant layer as the material surrounding the sealant layer cures and becomes stiff as it vulcanizes. A sealant material layer of about 0.3 inch thickness can have, for example, a cured thickness of about 0.2 inch.

A diagram of RPA test output during curing phase at 170° C. for 12 minutes is illustrated in FIG. 2.

The at least one substance capable of depolymerizing the non-halogenated butyl rubber according to the present invention can comprise at least one substance including a diphenyldisulfide structure that can break down the butyl polymer chain. Preferably, the diphenyldisulfide comprises 2,2'-dibenzamido-diphenylsulfide, and is illustrated by the following structure:

2,2'-dibenzamido-diphenyldisulfide

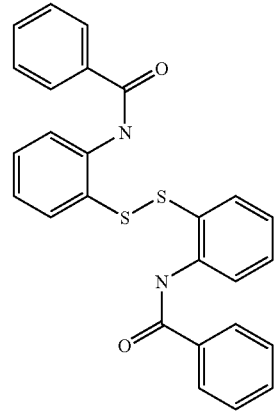 [SMILES: O=C(Nc1ccccc1SSc1ccccc1NC(=O)c1ccccc1)c1ccccc1]

Exemplary substances including a diphenyldisulfide structure include, but are not limited to Renacit 11 and/or Renacit VP KA 9199, available from Lanxess.

The butyl rubber (IIR) can be contained in the sealant material in any amount sufficient for providing sealing properties in the tire during use, such as the cured tire. For example, the non-halogenated butyl rubber can be present in the sealing material in an amount of 100 phr.

The at least one compound containing a diphenyldisulfide structure can be contained in the sealant material in any amount sufficient for sufficiently depolymerizing the non-halogenated butyl rubber. For example, the at least one compound containing a diphenyldisulfide structure can be present in the sealing material in an amount of 2 to 20 phr, 5 to 15, with a preferred amount being 12 phr.

The sealant material according to the present invention can contain in addition to the at least one non-halogenated butyl rubber and the at least one compound have a diphenyldisulfide structure, other components, and preferably components that provide desirable properties to the sealant material during production of the tire as well as in use to permit sealing of the tire. Thus, for example, one or more components can be added to the sealant material to increase modulus or stiffness of the material, to reduce cost of the starting material and/or to reduce viscosity for processing.

The sealant material can contain at least one modulus agent to increase stiffness, such as but not limited to, silica, inactive silica, precipitated silica, and active silica. The at least one modulus agent can be contained in the sealant material, for example, in an amount of 5 to 50 phr, 10 to 40 phr or 20 to 35 phr, with a preferred amount being 30 phr.

The sealant material can contain at least one process oil, such as a paraffinic oil. Such process oils can be added to the sealant material for various purposes, such as to reduce cost, achieve desired depolymerized sealant layer viscoelastic properties such as G', and/or to reduce viscosity of the sealant material during the preparation of the sealant layer through conventional processes of rubber article fabrication which are well known to those skilled in the art of rubber article preparation. The process oil can comprises materials, such as but not limited to aromatic oil, residual aromatic extracts (RAE), treated distillate aromatic extracts) TDAE, mild extraction solvates (MES), naphthenic oil, and paraffinic oil. The at least one process oil can be contained in the sealant material in an amount of 10 to 40, 15 to 35 phr, with a preferred amount being 30 phr.

The sealant material can contain a non-reinforcing filler, such as at least one clay. Preferably the non-reinforcing filler in present in an amount effective to aid in mastication of the non-halogenated rubber, and to permit lower temperature processing of the sealant material. The non-reinforcing filler can comprise materials, such as but not limited to clay, inactive silica, whiting such as plated calcium carbonate and mica. The at least one non-reinforcing filler can be continued in the sealant material in an amount of up to 15 phr, or up to 10 phr, with a preferred amount being 8 phr.

The surface area of the non-reinforcing agent preferably is below N660 determined by CTAB or other ASTM approved methods for determining the structure of carbon black which is known to those skilled in the art of rubber article design.

The sealant material can contain at least one tackifying agent, such as one or more phenolic resins. The tackifying agent is preferably contained in the sealant material in an amount effective to assist the sealant material gripping or sticking to other material, such as the carcass drum. The tackifying agent preferably comprises one or more phenolic resins, such as but not limited to Koresin, phenolic resin (epoxy modified), and aliphatic resin. The at least one tackifying agent can be contained in the sealant material in an amount up to 5 phr, with a preferred amount being 2.5 phr.

The sealant material can contain a whiting agent, such as calcium carbonate, talc. The whiting agent can be contained in sealant material in various concentrations, such as 0 to 5, 6 to 15, or 15 to 30 with a preferred valued being 5 phr.

The sealant material can contain a plasticizer, such as but not limited to Struktol 40-MS or PRO-MIX 400. The plasticizer can be contained in the sealant material in various concentrations, such as 0 to 5, 5 to 10 valued being 3 phr.

In accordance with this invention, any method can be utilized for manufacturing a pneumatic rubber tire having an outer circumferential tread, a supporting carcass therefore, and an inner liner disposed inwardly from the supporting carcass, containing the sealant material composition layer positioned between the inner liner and the carcass. A squeegee can also be contained in the tire and can be positioned between the sealant material and the carcass, or the sealant material can be contained between the squeegee and the inner layer.

For example, the sealant material composition can be included as a layer into an unvulcanized rubber tire below the carcass, and preferably between the squeegee layer and the carcass, during the tire building process; and shaping and curing the rubber tire at a temperature in a range of 130° C. to 170° C., such as 150° C., for a sufficient period time to cure the sealant material.

The sealant material composition can be also be contained in an inner tube of a tire for sealing the inner tube.

In a preferred embodiment of the invention, there is provided a pneumatic tire comprising an outer circumferential tread, a supporting carcass therefore and an inner rubber liner disposed inwardly from the supporting carcass, and a sealant material composition layer which is disposed between the carcass and the innerliner comprises the sealant material composition according to the present invention.

In the method of this invention, the sealant material composition layer can be assembled into an unvulcanized rubber tire. Thereafter, the tire can be vulcanized in a suitable mold at temperatures sufficient for curing the tire, which temperatures are sufficient to also cure the sealant material composition so that a cured sealant material composition is present. The sealant material composition layer can be assembled into an unvulcanized rubber tire between the supporting carcass of the tire (usually a diene-based, fabric or steel reinforced (such as three plies), sulfur curable rubber composition) and rubber innerliner layer, or air barrier layer, which is usually a sulfur curable, non-fabric reinforced, rubber composition which contains a halobutyl rubber such as for example chlorobutyl rubber or bromobutyl rubber. Such innerliner may alternatively include, for example, one or more sulfur curable diene-based elastomers such as, for example, cis 1,4-polyisoprene natural rubber, cis 1,4-polybutadiene rubber and styrene/butadiene rubber, and their mixtures, or more preferably a combination of one or more of the halobutyl rubbers and the diene based elastomers. The sealant material composition layer can be therefore sandwiched between the tire carcass and a rubber innerliner layer.

As discussed above, the physical nature of the sealant material composition is that its viscosity is sufficient to permit easy handling and processing during construction of an unvulcanized tire and during the vulcanization (curing) operation that is, the sealant material composition layer has enough uncured strength (modulus) and sufficient viscosity to retain its shape during building and enough building tack to stick to adjacent layers during building and enough strength to substantially retain its shape during the application of the high pressure and elevated temperature in a suitable mold during vulcanization.

As the tire is vulcanized together with green sealant material composition sandwiched between the tire carcass ply(s) and the tire's rubber innerliner, the non-halogenated butyl robber which forms the sealant layer, becomes partially depolymerized or degraded. In effect the non-halogenated butyl rubber is degraded to a low viscosity to form a tacky material which has puncture sealing properties. Thus, the sealant material layer is transformed into a puncture sealant layer during the curing of the tire. This partial depolymerization of the butyl rubber composition layer is effectuated by the presence of at least one diphenyldisulfide containing substance contained in the sealant material which causes the non-halogenated butyl rubber depolymerization by breaking the molecular chains, due to the highly unsaturated structure of the non-halogenated butyl rubber.

Non-halogenated butyl rubber for the sealant material can comprise any non-halogenated butyl rubber that is capable of achieving the uncured and cured properties for the sealant material composition with or without the presence of ingredients in addition to the compound containing a diphenyldisulfide structure.

The various components of the sealant layer can be mixed together using any convenient rubber mixing equipment, such as an internal rubber mixer. The rubber composition used in the sealant layer typically has sufficient viscosity and unvulcanized adhesion to preferably enable its incorporation into an unvulcanized tire without departing from standard, long standing tire building techniques and without the use of complicated, expensive tire building equipment.

In the method of this invention, the sealant material composition can be formed into a strip of uncured sealant material composition, by using equipment such as a calendar, extruder, or any combination thereof, that is assembled into the tire. In building the tires of this invention, a butyl rubber based (e.g. bromobutyl rubber) rubber innerliner can first be applied to a building dr and then the strip of butyl polymer composition (the sealant layer) can be applied to the layer of innerliner. After this strip of butyl rubber based rubber composition (eventual sealant layer) is assembled into the unvulcanized tire other normal tire components can be assembled into the tire using standard tire building methods. It is generally preferred for the sealant material composition layer to be assembled into the unvulcanized tire between an innerliner layer and tire carcass.

After the unvulcanized pneumatic rubber tires of this invention are assembled, they can be vulcanized using a normal tire cure cycle. The tires of this invention can be cured over a wide temperature range. For example, passenger tires might be cured at a temperature ranging from 132° C. (270° F.) to 166° C. (330° F.) and truck tires might be cured at a temperature ranging from 150° C. to 180° C. Thus, a cure, temperature may range, for example, from 130° C. to 180° C. and for a period of time (e.g. from 7 to 35 minutes or more depending somewhat upon the size of the tire and the degree of desired depolymerization of the non-halogenated butyl rubber) and sufficient to at least partially depolymerize the sealant material composition depending also upon the aforesaid choice of curing temperature. In practice, a period of time used to vulcanize the tires, in a suitable mold, may therefore, for example, have a duration of 10 to 14 minutes for a passenger tire and for 25 to about 35 minutes for a truck tire.

Accordingly, in one aspect of the invention, a self-sealing pneumatic rubber tire of this invention is envisioned wherein the tire has sidewalls, a supporting carcass, inextensible beads, an innerliner (air barrier layer), a sealant layer, and an outer circumferential tread (tread portion). The individual sidewalls extend radially inward from the axial outer edges of the tread portion to join the respective inextensible beads. The supporting carcass can act as a supporting structure for the tread portion and sidewalls. The sealant material composition layer can be disposed between the supporting carcass and the innerliner. The outer circumferential tread can be adapted to be ground contacting when the tire is in use.

The following examples are included to further illustrate tires according to the present invention and their self-sealing ability in use. These examples are intended to be representative of the present invention and are not to be regarded as limiting the scope of the invention or the manner in which it can be practiced. Unless specifically indicated otherwise, parts and percentages are given by weight.

EXAMPLE 1

A tubeless pneumatic steel belted rubber tire of the type 315/80R22.5 HSU was prepared using a sealant material prepared by mixing the following ingredients:
IIR: 1.5-2.0% unsaturated: 100 parts per hundred rubber (PHR)
40% Activated DBD+Clay—12 phr
Active silica granules—30 phr
Paraffinic Oil—30 phr
Phenolic Resin—2.5 phr
Clay—8 phr (Non DBD adsorbed, free clay)
The tire was cured a 145° C. for 50 minutes including the sealant material having a width of 8.5 inches and an uncured thickness of 0.30 inch centered on the innerliner+squeegee.

COMPARATIVE EXAMPLE 1

Goodyear Duraseal Tire—315/80R22.5 G287 MSA Truck Tire Load Range L
Test Procedure
The following is the test protocol for testing tires, with steps being performed based upon results through the protocol:

1. Tire mounted on an 8¼" rim and inflated to 130 psi.
2. Tire loaded with 7727 lbs and ran on the pulley wheel for 1 hour at 50 mph.
3. After 1 hour, pressure was reduced to 110 psi and 1st nail was inserted.
4. Tire inflated to 130 psi, loaded with 7727 lbs, and ran on the pulley wheel for 1 hour at 50 mph.
5. Pressure checked and then leakage at the nail site inspected with soapy water solution.
6. 2nd nail inserted 180 degrees from Nail 1.
7. Pressure checked, tire loaded with 7727 lbs, and ran on the pulley wheel for 1 hour at 50 mph.
8. Repeated steps 5-7 for the 3rd, placed 90 degrees from 1st nail, and 4th nail, placed 180 degrees from 3rd. Nails 1, 2, 3 were placed in the tread grooves while #4 was placed between the tread blocks.
9. Tire ran for 1 hour with 7727 lbs of load at 50 mph.
10. Pressure checked, each puncture site inspected for air leakage with soapy water solution.
11. Removed Nail 1 and checked air pressure and looked for air leakage with soapy water.
12. Repeated steps 9-11 for each remaining nail.
13. Nail 4 site did not seal when nail removed, tire ran at 7727 lbs of load at 50 mph for 5 minutes.
14. Test stopped after air loss continued.

Summary of Results
The Example 1 tire;
1. Tire mounted on an 8¼" rim and inflated to 130 psi.
2. Tire loaded with 7727 lbs and ran on the pulley wheel for 1 hour at 50 mph, 50 mph is actual wheel speed and not a corrected road speed. The corrected road speed with respect to the circumference of the drum is near 105 mph.
3. After 1 hour, pressure was reduced to 110 psi and 1st nail was inserted.
4. Tire inflated to 130 psi, loaded with 7727 lbs, and ran on the pulley wheel for 1 hour at 50 mph.
5. Pressure checked and then leakage at the nail site inspected with soapy water solution.
6. 2nd nail inserted 180 degrees from Nail 1.
7. Pressure checked, tire loaded with 7727 lbs, and ran on the pulley wheel for 1 hour at 50 mph.
8. Repeated steps 5-7 for the 3rd, placed 90 degrees from 1st nail, and 4th nail, placed 180 degrees from 3rd. Nails 1, 2, 3 were placed in the tread grooves while #4 was placed between the tread blocks.
9. Tire ran for 1 hour with 7727 lbs of load at 50 mph.
10. Pressure checked, each puncture site inspected for air leakage with soapy water solution.
11. Removed Nail 1 and checked air pressure and looked for air leakage with soapy water.
12. Repeated steps 9-11 for each remaining nail.
13. Nail 2 site sealed initially after nail was removed.
14. Nail 2 site ad not hold air pressure after 1 hour of service. Nail site #1 still holding pressure, no evidence of air loss after 3 hours of service at 7727 lbs at 50 mph.
15. Test stopped after air loss continued.

The Comparative Example 1 tire retained pressure while all the nails were still in the tire. Periodically small air leakage was detected right after the load was removed, but the leakages were not great enough to cause a noticeable change in air pressure and eventually sealed as the tire stood. When each of the first three nails was removed from the tire, air rushed out of the hole for a moment but quickly silenced as the void was sealed.

Pressure was checked after each nail was removed and only 2 lbs of pressure was lost after the first three nails were removed. For the 4th nail, the pressure loss was not stopped.

It was evident that the tire was not going to seal after the removal of the 4th flail so the tire was loaded at 7727 lbs and ran at 50 mph for 5 minutes in an attempt to force more Duraseal material into the hole. Then the tire was unloaded and the pressure continued to drop. At this point the test was stopped.

A review of a section at nail site 4 seems that there was not enough sealing material beneath his site because material flowed into the hole but there was not enough strength to provide a barrier against the internal pressure. This is evidenced by a hole through the sealing material visible on the liner side of the section.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing form the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A sealant material composition comprising at least one non-halogenated butyl rubber, and 2,2'-dibenzamido-diphenyldisulfide, the sealant material composition having a viscosity that permits the sealant material composition to be incorporated into a tire during a tire building process and to degrade to a lower viscosity that permits the resulting degraded sealant material composition to flow into and seal a puncture in a tire.

2. The sealant material composition according to claim 1, wherein the sealant material composition has an elastic storage modulus of 75 to 250 pka at 10% strain.

3. The sealant material composition according to claim 1, wherein the resulting degraded sealant material composition has an elastic storage modulus of 1 to 25 pka at 10% strain.

4. The sealant material composition according to claim 3, wherein the sealant has an elastic storage modulus of 75 to 250 pka at 10% strain.

5. The sealant material composition according to claim 1, wherein the 2,2'-dibenzamido-diphenyldisulfide is present in an amount of 2 to 20 phr.

6. The sealant material composition according to claim 5, wherein the 2,2'-dibenzamido-diphenyldisulfide is present in an amount of 5 to 15 phr.

7. The sealant material composition according to claim 4, further including at least one modulus agent.

8. The sealant material composition according to claim 7, wherein the at least one modulus agent comprises at least one silica containing material.

9. The sealant material composition according to claim 7, wherein the at least one modulus agent is present in an amount of 5 to 50 phr.

10. The sealant material composition according to claim 4, further comprising at least one process oil.

11. The sealant material composition according to claim 10, wherein the at least one process oil is present in an amount of 10 to 40 phr.

12. The sealant material composition according to claim 4, further comprising at least one non-reinforcing filler.

13. The sealant material composition according to claim 12, wherein the at least one non-reinforcing filler comprises at least one clay.

14. The sealant material composition according to claim 12, wherein the at least one non-reinforcing filler is present in an amount of up to 15 phr.

15. The sealant material composition according to claim 4, further comprising at least one tackifying agent.

16. The sealant material composition according to claim 15, wherein the at least one tackifying agent comprises at least one phenolic resin.

17. The sealant material composition according to claim 15, wherein the at least one tackifying agent is present in an amount of up to 5 phr.

18. The sealant material composition according to claim 4, further comprising a whiting agent.

19. The sealant material composition according to claim 4, further comprising, in addition to the at least one non-halogenated butyl rubber and the 2,2'-dibenzamido-diphenyldisulfide, at least one plasticizer.

20. A method of forming a sealant composition comprising combining at least one non-halogenated butyl rubber and 2,2'-dibenzamido-diphenyldisulfide so at the sealant material composition has a viscosity that permits the sealant material composition to be incorporated into a tire during a tire building process and to degrade to a lower viscosity that permits the resulting degraded sealant material composition to flow into and seal a puncture in a tire.

21. A sealant material composition formed by the method of claim 20.

22. An unvulcanized tire comprising an innerlayer, a carcass layer, and a sealant material composition material containing the sealant material composition of claim 1 as a layer between the innerlayer and the carcass layer.

23. An unvulcanized tire comprising an innerlayer, a carcass layer, and a sealant material composition material containing the sealant material composition of claim 21 as a layer between the innerlayer and the carcass layer.

24. The unvulcanized tire according to claim 23, wherein the layer of sealant material composition has a thickness of 0.1 inch to 0.5 inch.

25. The unvulcanized tire according to claim 23, wherein the layer of sealant material composition has a thickness of 0.2 to 0.5 inch.

26. A vulcanized tire comprising the sealant material composition according to claim 1, and the resulting degraded sealant material composition.

27. A vulcanized tire comprising the sealant material composition according to claim 21, and the resulting degraded sealant material composition.

* * * * *